United States Patent
Lu et al.

(10) Patent No.: US 12,280,949 B2
(45) Date of Patent: Apr. 22, 2025

(54) STORAGE AND SORTING METHOD AND APPARATUS, CONTROL DEVICE AND STORAGE MEDIUM

(71) Applicant: BEIJING JINGDONG ZHENSHI INFORMATION TECHNOLOGY CO., LTD., Beijing (CN)

(72) Inventors: Mengfan Lu, Beijing (CN); Xiaodong Yang, Beijing (CN); Shuandong Cui, Beijing (CN); Bin Zhao, Beijing (CN); Jinyu Liu, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 654 days.

(21) Appl. No.: 17/627,408

(22) PCT Filed: Mar. 24, 2020

(86) PCT No.: PCT/CN2020/080825
§ 371 (c)(1),
(2) Date: Jan. 14, 2022

(87) PCT Pub. No.: WO2021/012696
PCT Pub. Date: Jan. 28, 2021

(65) Prior Publication Data
US 2022/0258973 A1 Aug. 18, 2022

(30) Foreign Application Priority Data

Jul. 24, 2019 (CN) .......................... 201910671259.1

(51) Int. Cl.
B65G 1/04 (2006.01)
B07C 3/00 (2006.01)
(Continued)

(52) U.S. Cl.
CPC ............ *B65G 1/0485* (2013.01); *B07C 3/008* (2013.01); *B65G 47/31* (2013.01); *B65G 47/902* (2013.01)

(58) Field of Classification Search
CPC .... B65G 1/0485; B65G 47/31; B65G 47/902; B07C 3/008
See application file for complete search history.

(56) References Cited

U.S. PATENT DOCUMENTS 4,856,642 A     8/1989   Nicholson et al.
5,269,646 A * 12/1993   Focke .................... B65H 19/12
                                                                        414/789.6
(Continued)

FOREIGN PATENT DOCUMENTS

CN        1033604 A     7/1989
CN     101481039 A     7/2009
(Continued)

OTHER PUBLICATIONS

"First Office Action", CN Application No. 201910671259.1, Mar. 28, 2022, 8 pp.
(Continued)

*Primary Examiner* — Kyle O Logan
(74) *Attorney, Agent, or Firm* — Myers Bigel, P.A.

(57) ABSTRACT

The present invention provides a storage and sorting method and apparatus, a control device and a storage medium, and relates to the field of logistics. The storing and sorting apparatus of the present disclosure includes: a conveying device configured to convey articles; and at least one storage device, wherein the storage device is located over the conveying device, and is configured to obtain and store the articles conveyed on the conveying device in a storage phase, and release the stored articles to the conveying device in a sorting phase.

19 Claims, 13 Drawing Sheets

(51) Int. Cl.
  *B65G 47/31* (2006.01)
  *B65G 47/90* (2006.01)

(56) References Cited

U.S. PATENT DOCUMENTS

| | | | |
|---|---|---|---|
| 5,441,141 | A | 8/1995 | Bonnet |
| 10,086,998 | B1 | 10/2018 | Tilekar et al. |
| 11,014,765 | B1 * | 5/2021 | Dwivedi ................ B65G 15/22 |
| 2012/0323363 | A1 | 12/2012 | Izumi et al. |
| 2015/0225187 | A1 | 8/2015 | Razumov |
| 2017/0362046 | A1 | 12/2017 | Ohtake et al. |

FOREIGN PATENT DOCUMENTS

| | | |
|---|---|---|
| CN | 107334290 A | 11/2017 |
| CN | 108217039 A | 6/2018 |
| CN | 207628751 U | 7/2018 |
| CN | 109573425 A | 4/2019 |
| CN | 109748102 A | 5/2019 |
| CN | 109850457 A | 6/2019 |
| EP | 2093167 A1 | 8/2009 |
| JP | S61192606 A | 8/1986 |
| JP | H1017117 A | 1/1998 |
| JP | H11322024 A | 11/1999 |
| JP | 2006188305 A | 7/2006 |
| JP | 2011011869 A | 1/2011 |
| JP | 2012111577 A | 6/2012 |
| JP | 2013000860 A | 1/2013 |
| JP | 2015058986 A | 3/2015 |
| KR | 20190031435 A | 3/2019 |
| WO | 2017176855 A1 | 10/2017 |

OTHER PUBLICATIONS

"International Search Report and Written Opinion of the International Searching Authority with English language translation", International Application No. PCT/CN2020/080825, Jul. 2, 2020, 17 pp.

"Request for the Submission of an Opinion" with English language translation, KR Application No. 10-2022-7004849, Jul. 29, 2024, 11 pp.

"Communication with Supplementary European Search Report", EP Application No. 20844502.3, Jul. 5, 2023, 11 pp.

Notice of Reasons for Refusal and English language translation, JP Application No. 2022-503960, Feb. 26, 2024, 12 pp.

* cited by examiner

STORAGE AND SORTING METHOD AND APPARATUS, CONTROL DEVICE AND STORAGE MEDIUM

CROSS-REFERENCE TO RELATED APPLICATIONS

The present application a U.S. National Stage Application under 35 U.S.C. § 371 of International Patent Application No. PCT/CN2020/080825, filed on Mar. 24, 2020, which is based on and claims priority to China Patent Application No. 201910671259.1 filed on Jul. 24, 2019, the disclosures of which are incorporated by reference herein their entireties.

TECHNICAL FIELD

The present invention relates to the field of logistics, in particular to a storage and sorting method and apparatus, a control device and a storage medium.

BACKGROUND

During the process of logistics, goods need to pass through logistics transfer sites (logistics parks, sorting centers, etc.). The logistics transfer sites mainly complete the temporary storage, sorting and distribution of parcels. The large-scale logistics transfer sites may have a land area reaching as much as tens of thousands of square kilometers.

The temporary storage method of goods in the logistics transfer sites in the related art is mainly ground warehouse storage, wherein the large warehouse used has an area of greater than or equal to 3000 square meters, the medium warehouse has an area of about 1000 square meters to 3000 square meters, and the small warehouse has an area of about 500 square meters to 1000 square meters.

The sorting method of goods in the transfer sites mainly consists in manual sorting, semi-automatic mechanical sorting or automatic sorting. In the manual sorting, a large number of sorters are required, and the area required to be occupied by the sorting sites is about one-fourth of the area occupied by the stored goods; in the semi-automatic mechanical sorting, the machines and devices need to be manually operated to complete the sorting operation. The automatic sorting system often needs to occupy an area of more than 20,000 square meters. At the same time, it is necessary to build a three-dimensional warehouse with a height of 3 to 4 floors and various automatic facilities such as forklifts to cooperate with the automatic sorting system.

SUMMARY

According to one aspect of the present disclosure, a storing and sorting apparatus is provided. The storing and sorting apparatus comprises: a conveying device configured to convey articles; and at least one storage device, wherein the storage device is located over the conveying device and is configured to: obtain and store the articles conveyed on the conveying device in the storage phase; and release the stored articles to the conveying device in the sorting phase.

In some embodiments, the storing and sorting apparatus further comprises a shaft, wherein the storage device is nested on the shaft, and the storage device is configured to be driven to rotate about the shaft.

In some embodiments, an extending direction of the shaft is parallel to a conveying direction of the conveying device.

In some embodiments, the storing and sorting apparatus comprises a plurality of storage devices; and the plurality of storage devices are distributed along an axial direction of the shaft, and the plurality of storage devices are configured to be driven to rotate about the shaft separately or simultaneously.

In some embodiments, the storage device comprises a plurality of storage units configured to rotate about the shaft in the case where the storage device rotates about the shaft.

In some embodiments, the storage device is in the shape of a polygonal prism; each side of the polygonal prism is provided with a storage unit respectively, and each storage unit is configured to obtain and store one article.

In some embodiments, the storage unit comprises a retractable gripping end.

In some embodiments, the gripping end comprises a chuck or a mechanical gripper.

In some embodiments, the storing and sorting apparatus further comprises: an information entry device located on an opposite side of the conveying device along the conveying direction, and configured to obtain information of the articles to be entered into the conveying device.

In some embodiments, the storing and sorting apparatus further comprises: a differential conveying device located on an opposite side of the conveying device along a conveying direction, and configured to convey the articles to the conveying device and adjust a movement speed so that the distance between every two adjacent articles is equal.

In some embodiments, the storage device is configured to adsorb and store the articles conveyed on the conveying device by adsorption force, or to grip and store the articles conveyed on the conveying device by a mechanical structure in the storage stage.

In some embodiments, the storing and sorting apparatus further comprises: a control device connected to the conveying device and the storage device and configured to: control the conveying device to convey the articles under the storage device, and control the storage device to obtain the articles in the storage phase; and control the storage device to release the stored articles to the conveying device in the sorting stage.

According to one aspect of the present disclosure, a storage and sorting method is provided. The method comprises the steps of: determining whether there is an article entering a conveying device; selecting a target storage device from storage devices, and controlling the target storage device to obtain and store the article in the case where it is determined that an article enters the conveying device; wherein the storage device is located over the conveying device.

In some embodiments, the step of controlling the target storage device to obtain and store the article comprises: rotating the target storage device by a predetermined angle so that a position of the empty storage unit of the target storage device is opposite to the conveying device; conveying the articles under the target storage device; and controlling the empty storage unit of the target storage device to obtain and store the article.

In some embodiments, the number of target storage devices is one; the step of conveying the articles under the target storage device comprises: controlling the conveying device to convey the articles under the target storage device, wherein the number of articles is one; or the number of target storage devices is plural; the step of conveying the articles under the target storage device comprises: controlling the conveying device and the differential conveying device to convey a plurality of articles under a corresponding target storage device respectively, wherein the number of articles is not greater than the number of target storage devices.

In some embodiments, the storage and sorting method further comprises: selecting a destination of currently sorted articles; determining all storage devices that store articles destined for the selected destination as a release storage device; controlling the release storage device to release the articles destined for the selected destination to the conveying device; and controlling the conveying device to actuate to convey the articles to the destination.

According to one aspect of the present disclosure, a control device is provided. The control device comprises: a memory configured to store instructions; a processor configured to execute instructions, so that the control device performs operations for implementing any of the foregoing storage and sorting methods.

According to one aspect of the present disclosure, a computer-readable storage medium is provided, wherein the computer-readable storage medium stores computer instructions which when executed by a processor implements any of the foregoing storage and sorting methods.

BRIEF DESCRIPTION OF THE ACCOMPANYING DRAWINGS

In order to more explicitly explain the embodiments of the present disclosure or the technical solutions in the prior art, a brief introduction will be given below for the accompanying drawings required to be used in the description of the embodiments or the prior art. It is obvious that, the accompanying drawings illustrated below are merely some of the embodiments of the present disclosure. For those of ordinary skill in the art, other accompanying drawings may also be obtained according to such accompanying drawings on the premise that no inventive effort is involved.

DETAILED DESCRIPTION

Figure 1:
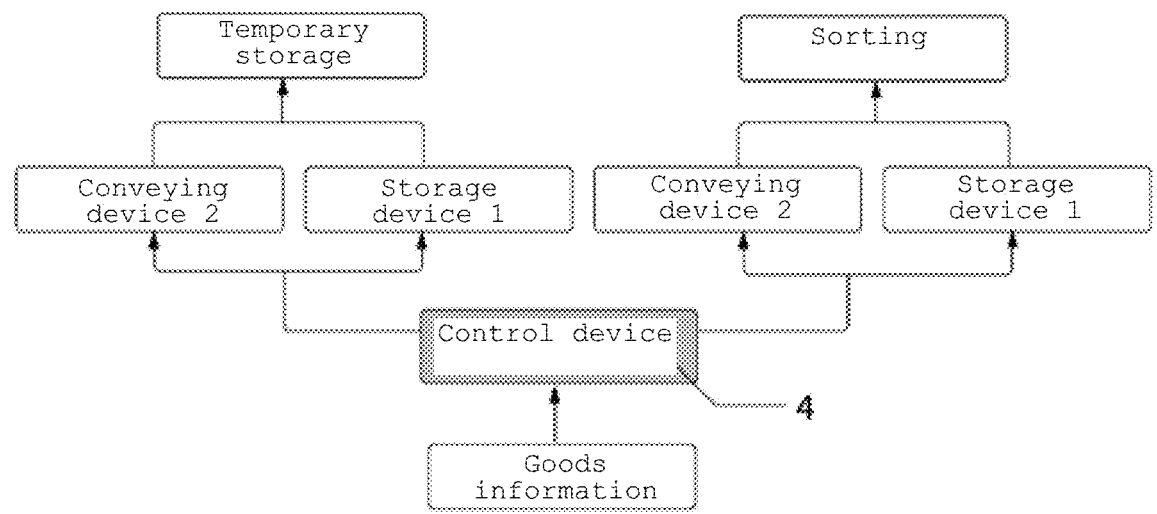
FIG. 1 is a schematic view of some embodiments of the storing and sorting apparatus of the present disclosure.

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The inventors have found through studies that: the temporary storage sites of the logistics transfer sites in the related art are ground warehouses. Since the transfer sites need to complete the collection and distribution of goods within the area, a large number of goods may be temporarily stored within the warehouse, and the warehouse needs a large area; in the related art, the goods sorting operation is completed in the transfer sites, but the sorting device occupies a large space; in the related art, the sorting process is cumbersome; in the related art, a lot of manpower and material resources are required to be consumed; in the related art, the cost of sorting device is high; in the related art, the allocation is separated from the temporary storage area in logistic nodes such as logistics parks, distribution centers, transfer sites and terminal sites, and goods need to be processed sequentially during the operation process to ensure first-in and first-out. During the process of warehouse entry, temporary storage, allocation, and delivery in the related art, the sequential temporary storage and the allocation consume time, with a low operation efficiency and a high labor cost.

FIG. 1 is a schematic view of some embodiments of the storing and sorting apparatus of the present disclosure. As shown in FIG. 1, the storing and sorting apparatus may comprise a conveying device 2 and at least one storage device 1. The storage device 1 is located over the conveying device 2.

The storage device 1 obtains and stores the articles conveyed on the conveying device in the storage stage; and sorts the stored articles to the conveying device in the sorting stage.

In some embodiments, the storage device adsorbs the articles conveyed on the conveying device by an adsorption force in the storage stage, and stores them in the storage device.

In some embodiments, the adsorption force may be an adsorption force such as a magnetic adsorption force or a vacuum adsorption force, and the adsorption force may be generated by a retractable gripping end provided on the storage device. In some embodiments, the gripping end may be a chuck.

In other embodiments, in the storage stage, the storage device grips the articles conveyed on the conveying device by a mechanical structure and store them in the storage device. In some embodiments, the articles may be gripped by the retractable gripping end provided on the storage device. In some embodiments, the gripping end may be a mechanical gripper.

In some embodiments, as shown in FIG. 1, the storing and sorting apparatus may further comprise a control device 4 which is connected to the conveying device 2 and the storage device 1 respectively.

The control device 4 controls the conveying device to convey the articles under the storage device, and controls the storage device to obtain the articles in the storage stage; controls the storage device to release the stored articles to the conveying device in the sorting stage.

In some embodiments, the control device 4 may control the conveying device to convey the articles under the storage device in the storage stage, control the storage device to generate the adsorption force to adsorb the articles to the storage device for temporary storage; and control the adsorption force of the storage device to disappear to release the articles on the storage device to the conveying device in the sorting phase.

In the storing and sorting apparatus provided on the basis of the above-described embodiments of the present disclosure, the storage device and the sorting device are integrally designed so that it is possible to realize automatic storage and automatic sorting of articles, thereby simplifying the operation process of storage and sorting; since a special sorting device is not required in the above-described embodiments, the space occupied by the sorting device is saved; at the same time, in the above-described embodiments of the present disclosure, operators are not required to complete the sorting operation, which improves the per capita efficiency compared with manual sorting.

Figure 2:
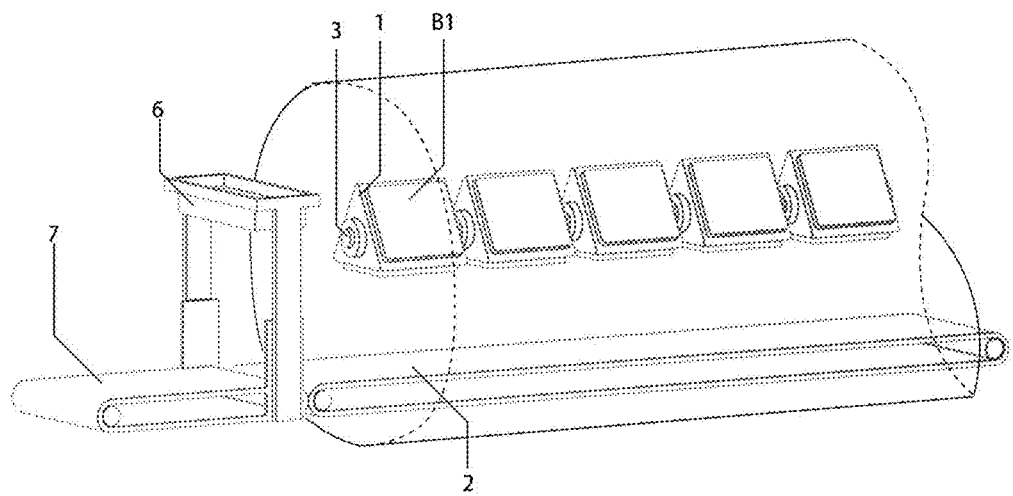
FIG. 2 is a three-dimensional schematic view of other embodiments of the storing and sorting apparatus of the present disclosure.
Figure 3:
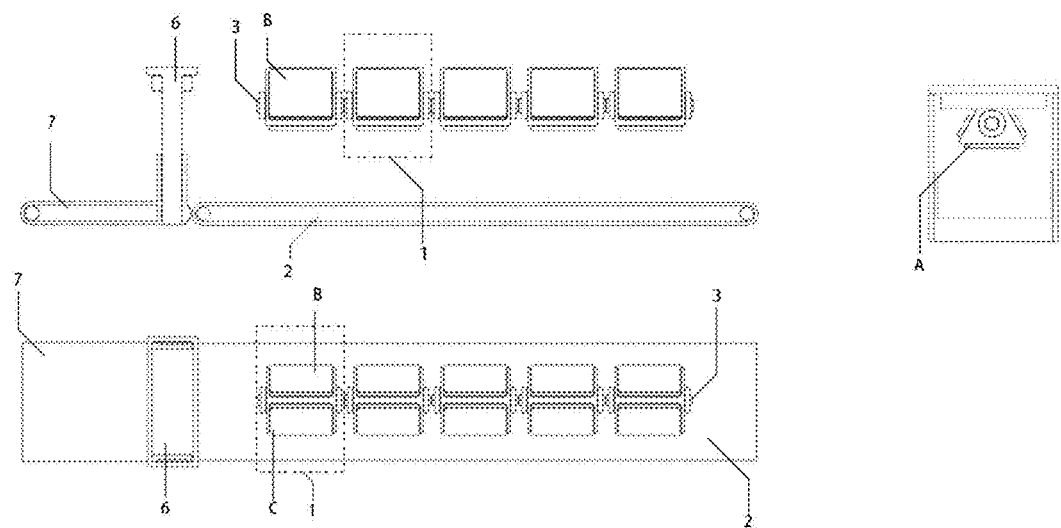
FIG. 3 is a three-view diagram of the embodiment of FIG. 2 in a static state, wherein the upper left view is a front view, the lower left view is a top view, and the right view is a side view.

FIG. 2 is a three-dimensional schematic view of other embodiments of the storing and sorting apparatus of the present disclosure. FIG. 3 is a three-view diagram of the embodiment of FIG. 2 in a static state. As shown in FIGS. 2 and 3, the storing and sorting apparatus may comprise a conveying device 2, a control device 4 (as shown in FIG. 1), and at least one storage device 1. In some embodiments, the storing and sorting apparatus may comprise a plurality of storage devices 1. In some embodiments, as shown in FIG. 2 or 3, the number of the storage devices 1 is 5.

Such storing and sorting apparatus is provided with a plurality of storage locations, which increases the storage space and raises the difficulty of the task of sorting the articles that can be processed.

In some embodiments, as shown in FIGS. 2 and 3, the storing and sorting apparatus may also comprise a shaft 3. The storage device 1 is nested on the shaft 3, a plurality of storage devices 1 are distributed along an axial direction, and the number of storage devices 1 is not limited. The storage device 1 may be driven to rotate about the shaft 3. The conveying device 2 extends in the same direction as the shaft 3, and is located under the shaft 3 and the storage device 1. The control device 4 controls each storage device 1 to rotate separately, or controls a plurality of storage devices 1 to rotate at the same time.

In some embodiments, the storing and sorting apparatus may comprise a plurality of storage devices 1 which distributed along the axial direction of the shaft 3, such that the plurality of storage devices 1 may be driven to rotate about the shaft 3 separately or simultaneously.

In some embodiments, at a periphery of the shaft, each storage device is provided with a plurality of storage units rotatable about the shaft.

In some embodiments, the shape of the storage device 1 is a polygonal prism; each side of the polygonal prism is provided with a storage unit respectively; each storage unit is configured to obtain and store one article. Such storing and sorting apparatus can increase the number of articles that can be stored in a single storage device, increase the storage locations, and further raise the utilization of space and the difficulty of the task of sorting the articles that can be processed.

In some embodiments, the storage unit comprises a retractable gripping end, for example, it may be a mechanical gripper or a chuck. The retractable direction of the gripping end is perpendicular to the extension direction of the shaft 3. When the storage unit rotates over the conveying device 2, the retractable gripping end approaches the conveying device 2 to grip the goods and then returns, so that the goods are separated from the conveying device 2, and are also able to rotate about the shaft 3 subsequently, which allows that the space occupied by the storage unit and the goods may not affect the operating space of the conveying device 2 and avoid collision of the goods. Similarly, when the storage unit rotates over the conveying device 2 in the sorting phase, the gripping end approaches the conveying device 2, releases the goods, and then the gripping end returns, so that the goods are freely conveyed without interference by the gripping end. The retractable action of the gripping end may be driven by an electric cylinder, an air cylinder or a hydraulic cylinder.

Figure 4:
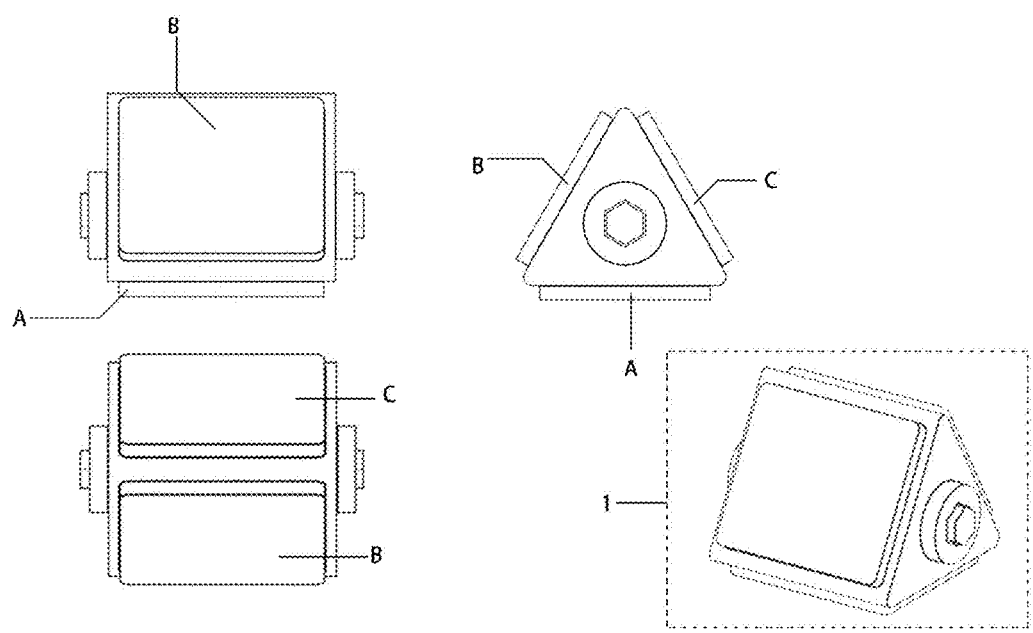
FIG. 4 is a three-dimensional schematic view and a three-dimensional view of the storage device in some embodiments of the present disclosure.

FIG. 4 is a three-dimensional schematic view and a three-dimensional view of the storage device in some embodiments of the present disclosure, wherein the upper left view is a front view of the storage device in one state, the lower left view is a top view in the same state, the upper right view is a side view, and the lower right view is a three-dimensional schematic view. The shape of the storage device 1 is not limited to that shown in the embodiment of FIG. 4. In the embodiment of FIG. 4, the shape of the storage device is a regular triangular prism. There are three (but not limited to three) storage units distributed on the outer surface of the storage device 1 shown in FIG. 4, which are the storage unit A, the storage unit B, and the storage unit C respectively. The storage unit obtains and releases the articles 5 under the control of the control device 4. For example, under the control of the control device 4, the storage unit may generate electromagnetic adsorption force or make electromagnetic adsorption force disappear, which corresponds to absorbing articles and releasing articles respectively.

In some embodiments of the present disclosure, as shown in FIGS. 2 and 3, the storing and sorting apparatus may further comprise an information entry device 6. The information entry device 6 is provided on an opposite side of the conveying device 2 along the conveying direction. The information entry device 2 obtains the information of articles to be entered into the conveying device, and sends the information of the articles to the control device.

Such storing and sorting apparatus facilitates the control device to obtain the conditions of articles in time, so as to control the storage device and the conveying device to perform operations in time.

In some embodiments of the present disclosure, as shown in FIGS. 2 and 3, the storing and sorting apparatus may further comprise a differential conveying device 7, wherein: the differential conveying device 7 is on an opposite side of the conveying device 2 along the conveying direction. The differential conveying device 7 conveys the articles to the conveying device and makes an equal distance between every two adjacent articles.

In some embodiments, the differential conveying device 7 may control a distance between two adjacent articles after the articles are conveyed to the conveying device 2 by controlling the transmission speed of the differential conveying device 7. For example, in the case where the distance between two adjacent articles placed on the differential conveying device 7 is less than a predetermined distance, after a previous article is conveyed to the conveying device, the speed of the differential conveying device 7 is reduced; in the case where the distance between two adjacent articles on the differential conveying device 7 is greater than a predetermined distance, after a previous article is conveyed to the conveying device, the speed of the differential conveying device 7 is increased.

Such storing and sorting apparatus may make an even distance between the articles on the conveying device 2, and improve the reliability of the storage device for obtaining and releasing articles.

In some embodiments, the storing and sorting apparatus may further comprise an article packaging device, wherein: the article packaging device comprises a packaging outer layer and a secondary packaging outer layer.

In some embodiments, in the case where the storage device uses a mechanical structure in a gripping manner to obtain articles, the packaging outer layer is provided with a structure corresponding to the mechanical structure to facilitate the gripping by the mechanical structure, and the secondary packaging outer layer is configured to prevent that the articles inside the article packaging device are destroyed by the mechanical structure.

In some embodiments, in the case where the storage device obtains articles by an adsorption force which is a magnetic adsorption force, at least one surface of the packaging outer layer is provided with a magnetic adsorbable material which can be adsorbed by the storage device (for example, at least one of the storage unit A, B, or C). The secondary packaging outer layer is formed of a magnetic shielding material to prevent that the articles inside the article packaging device are magnetized.

In some embodiments, in the case where the storage device obtains articles by an adsorption force which is vacuum adsorption force, at least one surface of the package outer layer is provided with a vacuum adsorbable material that can be adsorbed by the storage device; the secondary packaging outer layer is formed of a vacuum shielding material to prevent that the articles inside the article packaging device are damaged by vacuum adsorption.

The storing and sorting apparatus provided by the above-described embodiments of the present disclosure is an integrated storing and sorting apparatus, which uses article obtaining (by electromagnetic adsorption, vacuum adsorption or a gripping manner by a mechanical structure) and shaft rotation to complete the temporary storage and sorting of articles.

Compared with the temporary storage warehouses in the related art, the above-described embodiments of the present disclosure may be applied to underground and ground multi-dimensional space scenarios so that there are many applicable environments; in the case of temporarily storing the same amount of articles, compared with the temporary storage warehouses in the related art, the space in a vertical direction may be used in the present disclosure, thereby reducing the area required for temporary storage, raising the utilization of the temporary storage space, and improving the benefits that can be produced per unit area.

The above-described embodiments of the present disclosure integrally designs the storage device and the sorting device, which may realize automatic storage and automatic sorting of articles, thereby simplifying the operation process of storage and sorting. Since a special sorting device is not required in the above-described embodiments of the present disclosure, the space occupied by the sorting device is saved. At the same time, operators are not required to complete the sorting operation in the above-described embodiments of the present disclosure, and compared with manual sorting, the benefits that can be produced per unit labor are improved and the labor cost is reduced.

The integrated storing and sorting apparatus of the above-described embodiments of the present disclosure can support the disordered sorting and temporary storage of articles, thereby saving the time for the sorting operation of articles in a first-in and first-out manner, and the time for searching for articles during the process of warehouse entry→inventory→delivery. The above-described embodiments of the present disclosure are suitable for the temporary storage and sorting of fresh articles. After the temporary storage, sort-out is performed in time according to the temporal sequence of the shelf life within the shelf life of articles.

Figure 5:
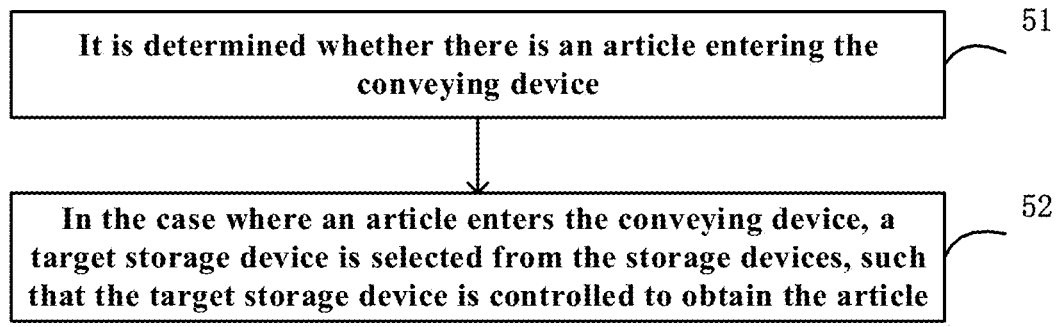
FIG. 5 is a schematic view of some embodiments of the storage and sorting method of the present disclosure.

FIG. 5 is a schematic view of some embodiments of the storage and sorting method of the present disclosure. Preferably, this embodiment may be implemented by the storing and sorting apparatus or the control device of the present disclosure. This method comprises the following steps:

In step 51, it is determined whether there is an article entering the conveying device. The conveying device may be a conveying device in the storing and sorting apparatus according to any of the above embodiments (for example, any of the embodiments shown in FIGS. 1 to 4).

In some embodiments of the present disclosure, the step 51 may comprise: determining whether an article enters the conveying device according to an input signal of the information entry device. The information entry device may be the information entry device in the storing and sorting apparatus according to any of the above embodiments (for example, any of the embodiments in FIGS. 1 to 4).

In step 52, in the case where an article enters the conveying device, a target storage device is selected from the storage devices, such that the target storage device is controlled to obtain the article. The storage device may be a storage device in the storing and sorting apparatus according to any of the above embodiments (for example, any of the embodiments in FIGS. 1 to 4).

In some embodiments of the present disclosure, the step 52 may comprise step 521 to step 523.

In step 521, in the case where an article enters the conveying device, it is determined whether the storing and sorting apparatus comprises a storage device that is not in full storage. In the case where the storing and sorting apparatus comprises a storage device that is not in full storage, the step 522 is performed.

In step 522, a target storage device is selected from the storage devices that are not in full storage according to a predetermined rule, and then step 523 is performed.

In step 523, the target storage device obtains and stores the article.

In some embodiments of the present disclosure, the step 523 may comprise step S231 to step S233.

In step S231, the target storage device is rotated a predetermined number of degrees so that the position of an empty storage unit of the target storage device is opposite to the conveying device.

In step S232, the conveying device conveys the articles under the target storage device, and suspends the operation, so that the empty storage unit has sufficient time and location conditions to obtain the article.

In some embodiments, there may be one target storage device, so that the step S232 may comprise: controlling the conveying device to convey the articles under the target storage device, wherein the number of articles is one.

In some embodiments, there may be a plurality of target storage devices, so that the step S232 may comprise: controlling the differential conveying device and the conveying device to convey a plurality of articles under the corresponding target storage device respectively, that is, the distance between adjacent articles matches the distance between the respective corresponding target storage devices. The number of articles is not greater than the number of target storage devices.

In step S233, the empty storage unit of the target storage device is controlled to obtain the article.

In some embodiments, the step S233 may comprise: controlling an empty storage unit of the target storage device to adsorb the articles conveyed on the conveying device to the empty storage unit of the target storage device by adsorption force for storage.

In some embodiments, the step S233 may comprise: controlling an empty storage unit of the target storage device to generate a magnetic adsorption force, so that the article is adsorbed to the target storage device.

In some embodiments, the step S233 may comprise: controlling the mechanical structure to grip the articles conveyed on the conveying device to an empty storage unit of the target storage device for storage.

In the storage and sorting method provided on the basis of the above-described embodiments of the present disclosure, compared with the temporary storage warehouses in the related art, the above-described embodiments of the present disclosure may be applied to underground and ground multi-dimensional space scenarios so that there are many applicable environments; in the case of temporarily storing the same amount of articles, compared with the temporary storage warehouses in the related art, the space in a vertical direction may be used, thereby reducing the area required for temporary storage, raising the utilization of the temporary storage space, and improving the benefits that can be produced per unit area.

In the following specific embodiments of the present disclosure, articles are obtained and released by magnetic adsorption force. The following embodiments of the present disclosure are also applicable to other methods such as non-magnetic adsorption force and gripping by a mechanical structure for obtaining and releasing articles.

FIGS. 6A-6H are schematic views of the temporary storage process of the storage and sorting method in some embodiments of the present disclosure. As shown in FIGS. 6A-6H, the storage and sorting method may comprise step 61 to step 68.

Figure 6A:
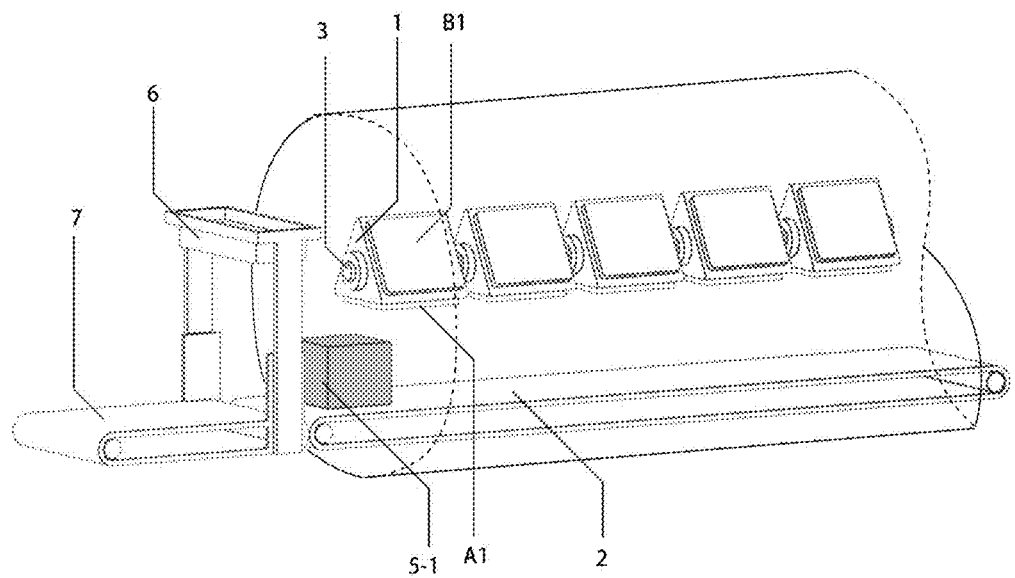
FIGS. 6A-6H are schematic views of the temporary storage process of the storage and sorting method in some embodiments of the present disclosure.
Figure 6B:
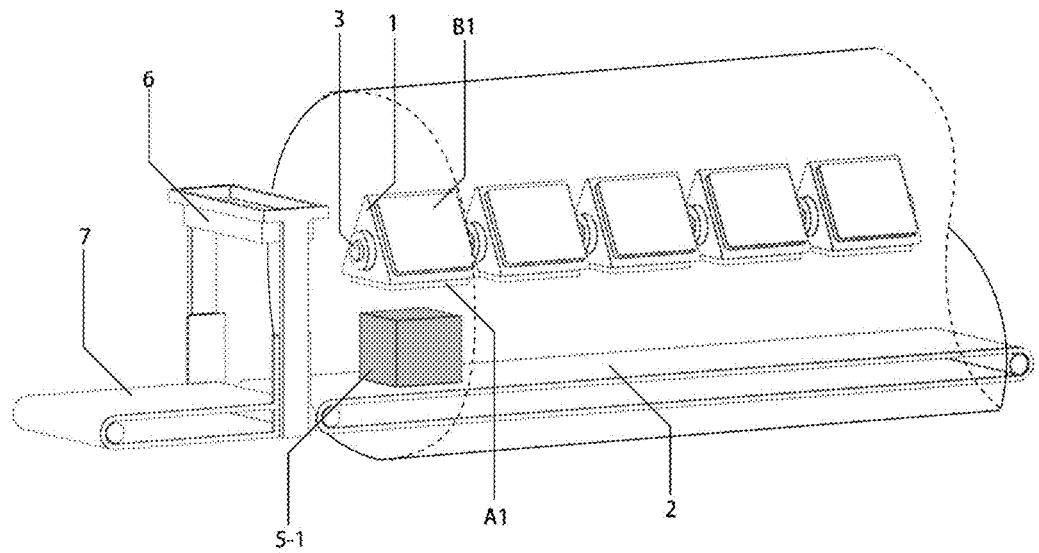

In step 61, all articles need to pass through the information entry device 6 before temporary storage, and the information entry device 6 inputs the article information to the control device 4. As shown in FIG. 6A, the article 5-1 reaches the conveying device 2 after passing through the information entry device 6. As shown in FIG. 6B, the article 5-1 is conveyed under the storage unit A in one of the rotatable storage devices 1 via the conveying device 2.

Figure 6C:
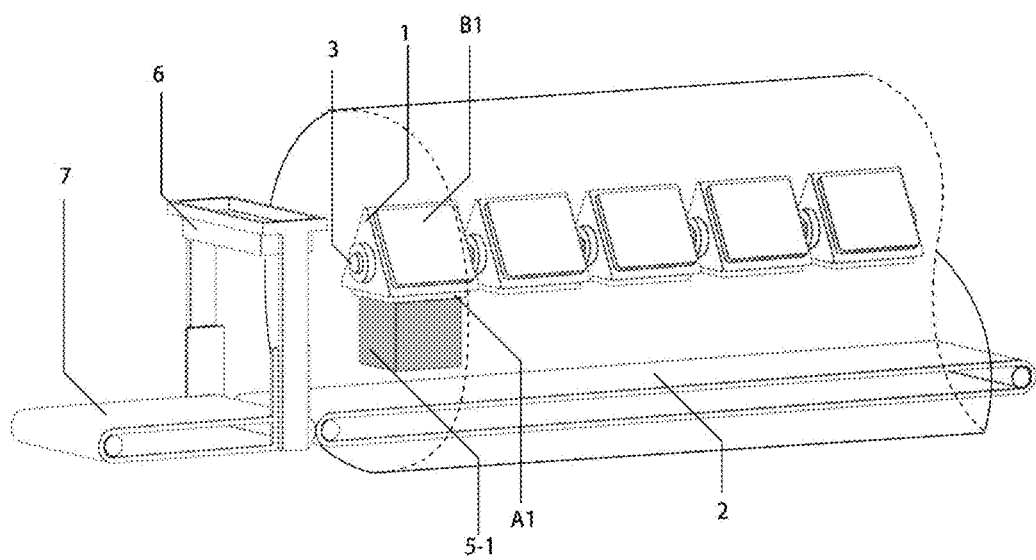

In step 62, as shown in FIG. 6C, the control device 4 outputs the information to the conveying device 2 so that the conveying device 2 suspends conveying, and at the same time outputs the information to the rotatable storage device 1, so that the storage unit A1 generates magnetic adsorption force, and the article 5-1 is adsorbed.

Figure 6D:
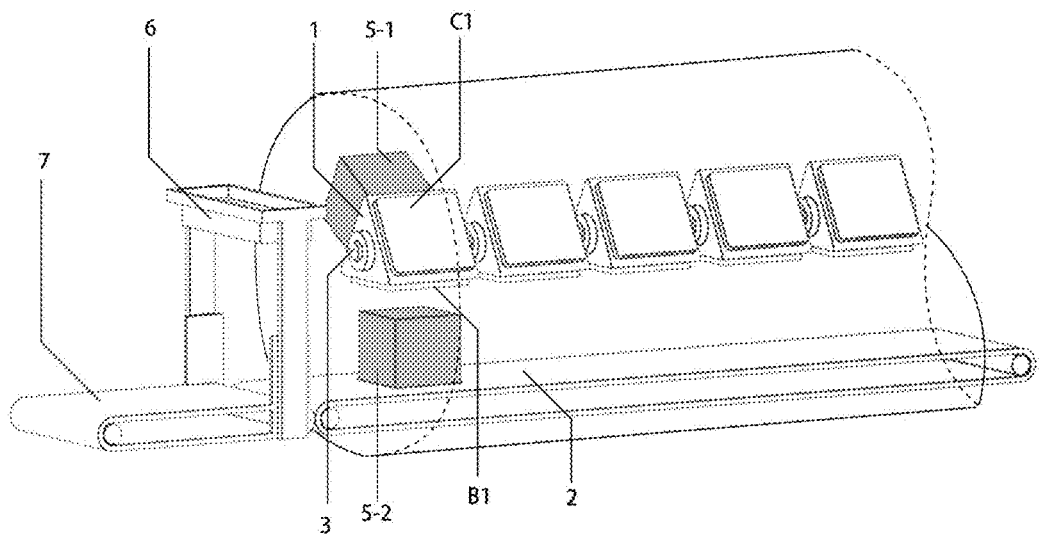

In step 63, the rotatable storage device 1 and the article 5-1 rotate about the shaft 3 by a certain degree (which may be 120 degrees as shown in FIG. 6C and FIG. 6D), so that the storage unit B1 is opposite to the conveying device 2, as shown in FIG. 6D.

In step 64, as shown in FIG. 6D, the control device 4 controls the conveying device 2 to actuate, so that the article 5-2 is conveyed under the storage unit B1.

Figure 6E:
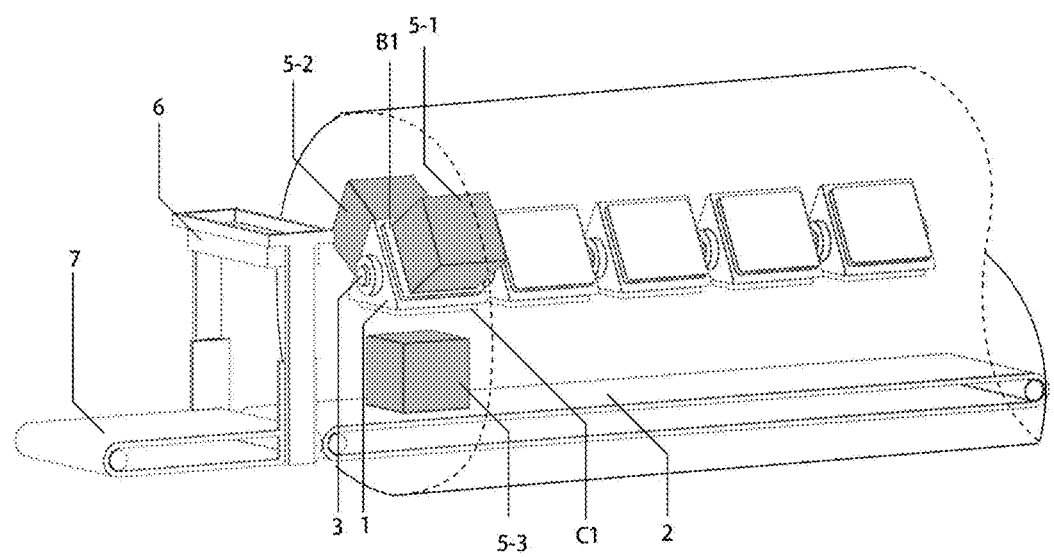

In step 65, as shown in FIG. 6E, the control device 4 outputs the information to the conveying device 2 so that the conveying device 2 suspends conveying, and at the same time outputs the information to the rotatable storage device 1, so that the storage unit B1 generates magnetic adsorption force, and the article 5-2 is adsorbed. The rotatable storage device 1, the article 5-1, and the article 5-2 rotate together about the shaft 3 by a certain degree (which may be 120 degrees as shown in FIG. 6D and FIG. 6E), so that the storage unit C1 is opposite to the conveying device 2, as shown in FIG. 6F.

Figure 6F:
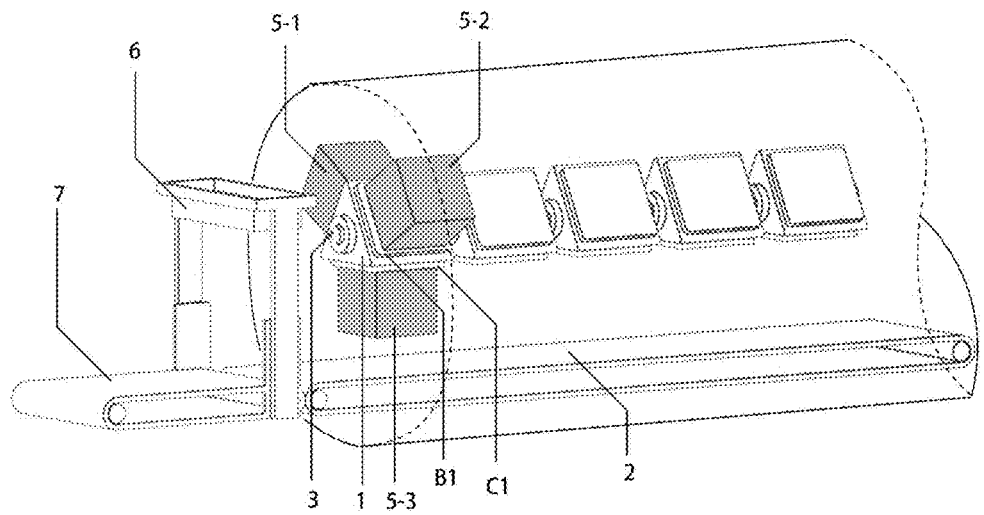

In step 66, as shown in FIG. 6F, the control device 4 controls the conveying device 2 to actuate, so that the article 5-3 is conveyed under the storage unit C1.

Figure 6G:
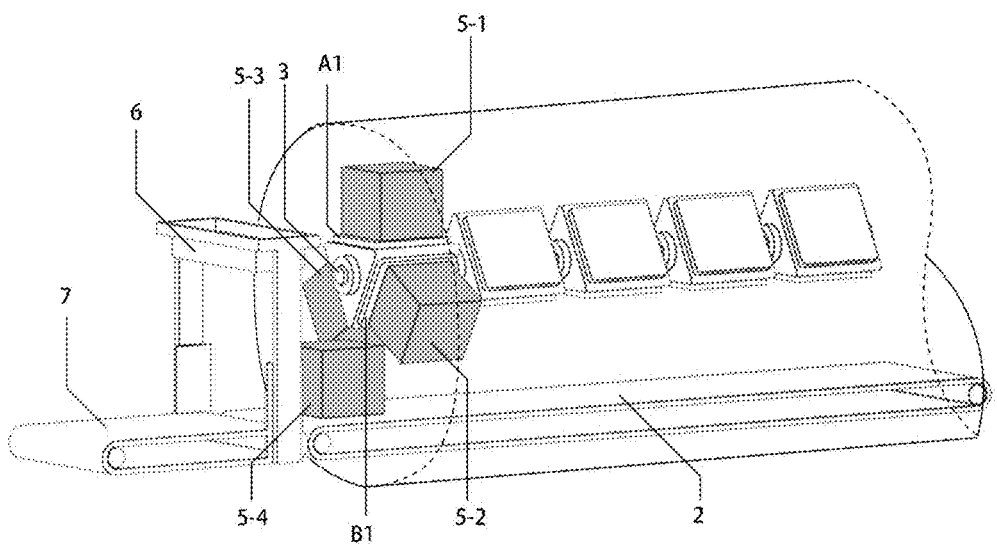

In step 67, as shown in FIG. 6G, the control device 4 outputs the information to the conveying device 2 so that the conveying device 2 suspends conveying, and at the same time outputs the information to the rotatable storage device 1, so that the storage unit C1 generates magnetic adsorption force, and the article 5-3 is adsorbed. The control device outputs a signal to the rotatable storage device 1, so that the rotatable storage device 1 rotates together with the article 5-1 the article 5-2, and the article 5-3 about the shaft 3 by a certain degree (for example 60 degrees), so that the other articles such as the article 5-4 can smoothly pass on the conveying device 2.

Figure 6H:
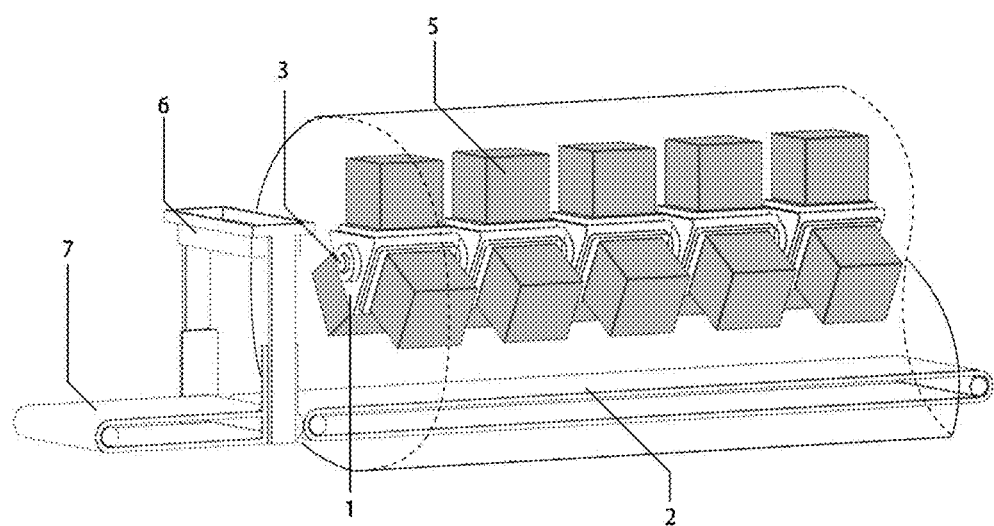

In step 68, the temporary storage method of other rotatable storage devices is the same as the above steps. The temporary storage of articles may be ceased when all articles are temporarily stored or all rotatable storage devices are fully adsorbed with articles, as shown in FIG. 6H. In the above-described embodiments of the present disclosure, the articles are temporarily stored in the storage device one by one in sequence, wherein the predetermined rule in the step of selecting the target storage device from the storage devices that are not in full storage according to a predetermined rule may be: the storage device in the storage devices that are not in full storage closest to the entry of the articles (that is, closest to the entrance of the conveying device) is taken as the target storage device, and the newly arrived articles are stored to the next storage device in the case where the storage device closest to the entry of the articles is in full storage.

FIGS. 7A-7F are schematic views of the temporary storage process of storage and sorting method in other embodiments of the present disclosure. As shown in FIGS. 7A-F, the storage and sorting method may comprise step 70 to step 79.

Figure 7A:
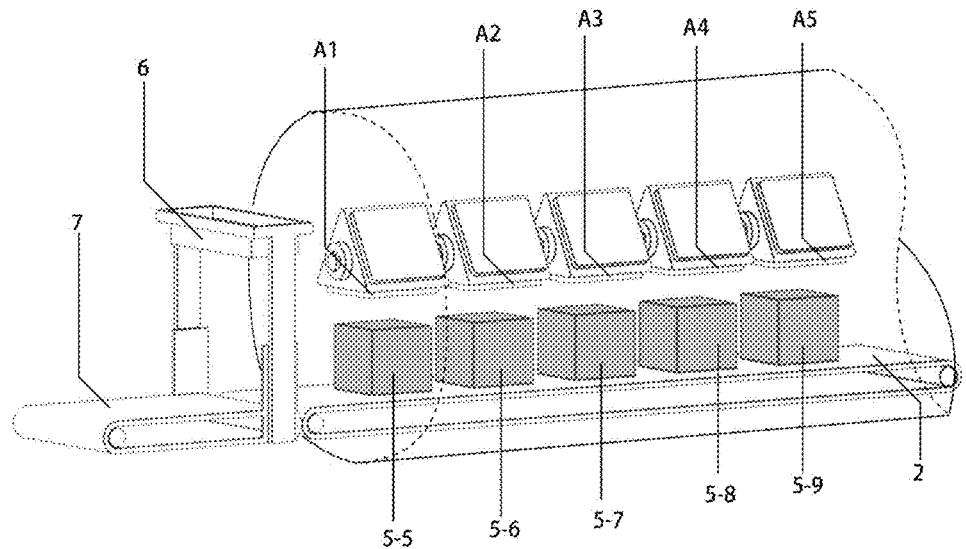
FIGS. 7A-7F are schematic views of the temporary storage process of storage and sorting method in other embodiments of the present disclosure.

In step 70, a group of articles 5-5, 5-6, 5-7, 5-8 and 5-9 (not limited to five articles) sequentially pass through the differential conveying device 7 and the information entry device 6 to arrive at the conveying device 2. As shown in FIG. 7A, the articles may be arranged equidistantly on the conveying device 2 under the action of the differential conveying device 7, and the number of this group of articles corresponds to the number of storage devices. as shown in FIG. 7A, articles 5-5, 5-6, 5-7, 5-8 and 5-9 exactly correspond to five storage units A1, A2, A3, A4 and A5.

Figure 7B:
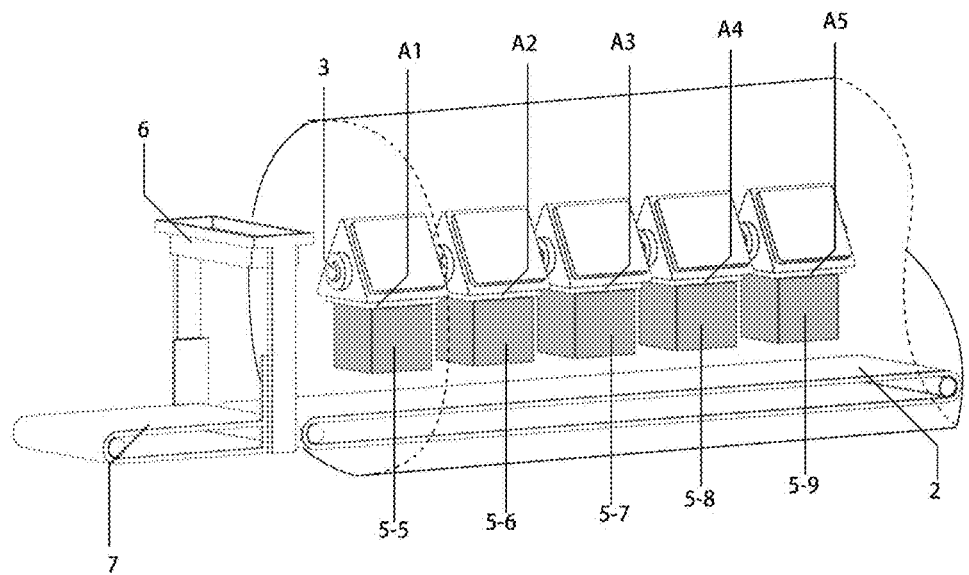

In step 71, as shown in FIG. 7B, the control device 4 outputs the information to the conveying device 2 so that the conveying device 2 suspends conveying, and at the same time outputs the information to each rotatable storage device, so that the storage units A1, A2, A3, A4 and A5 generate magnetic adsorption force, and the articles 5-5, 5-6, 5-7, 5-8 and 5-9 are adsorbed.

Figure 7C:
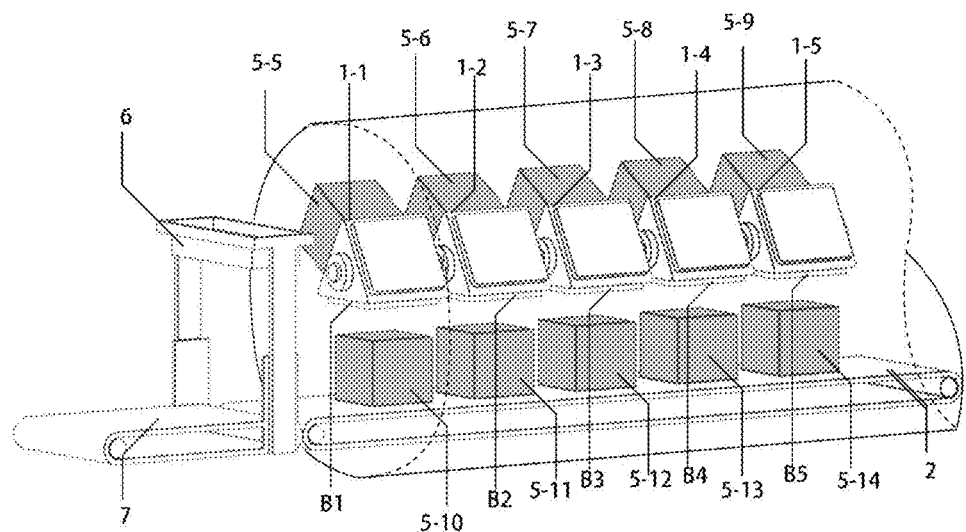

In step 72, each rotatable storage device rotates together with the group of articles 5-5, 5-6, 5-7, 5-8 and 5-9 about the shaft 3 by a certain degree (for example, 120 degrees), so that the storage unit B1, B2, B3, B4 and B5 are opposite to the conveying device 2, as shown in FIG. 7C.

In step 73, as shown in FIG. 7C, the control device 4 controls the conveying device 2 to actuate, so that the next group of articles 5-10, 5-11, 5-12, 5-13 and 5-14 are conveyed under the storage units B1, B2, B3, B4 and B5.

Figure 7D:
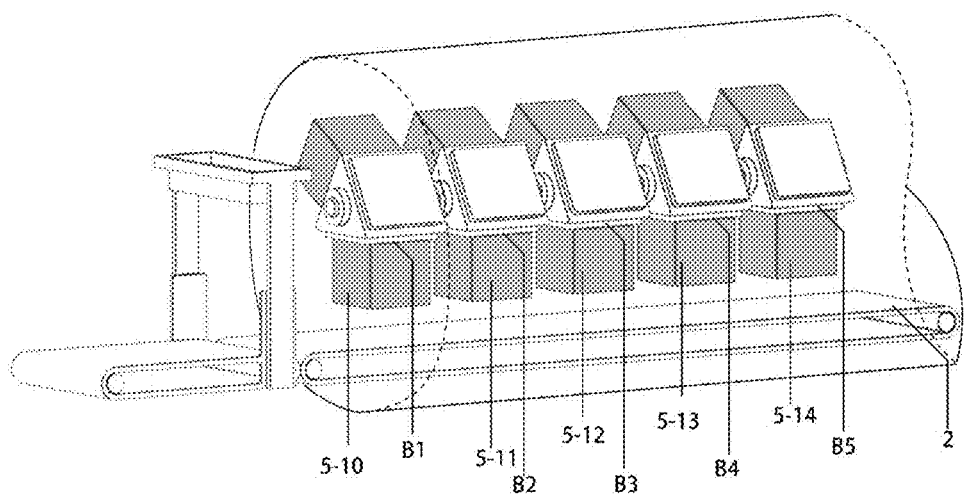

In step 74, as shown in FIG. 7D, the control device 4 outputs the information to the conveying device 2 so that the conveying device 2 suspends conveying, and at the same time outputs the information to each rotatable storage device, so that the storage units B1, B2, B3, B4 and B5 generate magnetic adsorption force, and the articles 5-10, 5-11, 5-12, 5-13 and 5-14 are adsorbed.

Figure 7E:
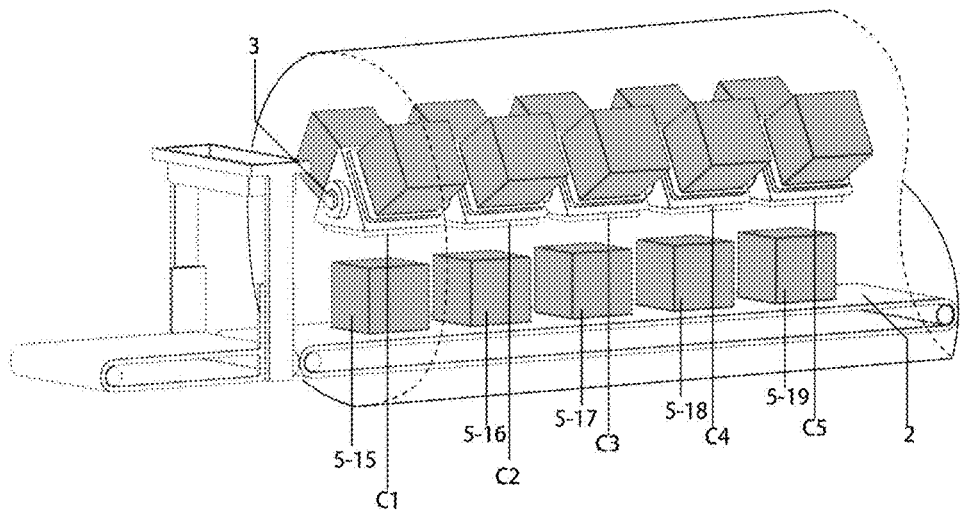

In step 75, the control device 4 outputs the information to each rotatable storage device, so that the rotatable storage device rotates together with all the adsorbed articles about the shaft 3 by a certain degree (for example 120 degrees), and the storage units C1, C2, C3, C4 and C5 are opposite to the conveying device 2, as shown in FIG. 7E.

In step 76, as shown in FIG. 7E, the control device 4 controls the conveying device 2 to actuate, so that the articles 5-15, 5-16, 5-17, 5-18 and 5-19 are conveyed under the storage units C1, C2, C3, C4 and C5.

In step 77, the control device 4 outputs the information to the conveying device 2 so that the conveying device 2 suspends conveying, and at the same time outputs the information to each rotatable storage device. The storage units C1, C2, C3, C4 and C5 generate magnetic adsorption force, and articles 5-15, 5-16, 5-17, 5-18 and 5-19 are adsorbed.

Figure 7F:
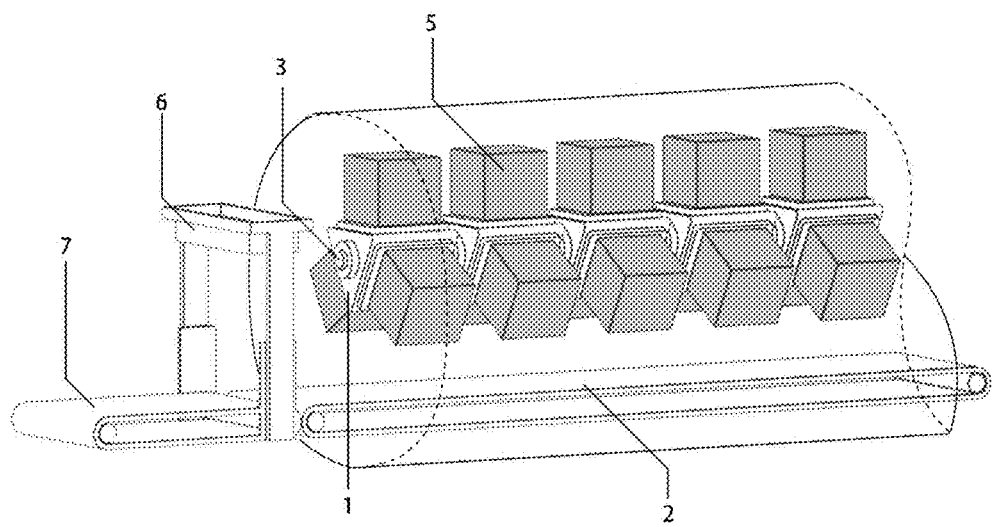

In step 78, as shown in FIG. 7F, the control device outputs a signal to each rotatable storage device, so that the rotatable storage device rotates together with all the adsorbed articles about the shaft 3 by a certain degree (for example 60 degrees), to raise the height of the empty space over the conveying device 2, so that other articles can smoothly pass on the conveying device 2.

In step 79, the temporary storage of articles may be ceased when all the articles are temporarily stored or all the rotatable storage devices are fully adsorbed with articles.

In the above-described embodiments of the present disclosure, the differential conveying device is used to realize the temporary storage of articles in the storage device with a group as a unit.

Figure 8:
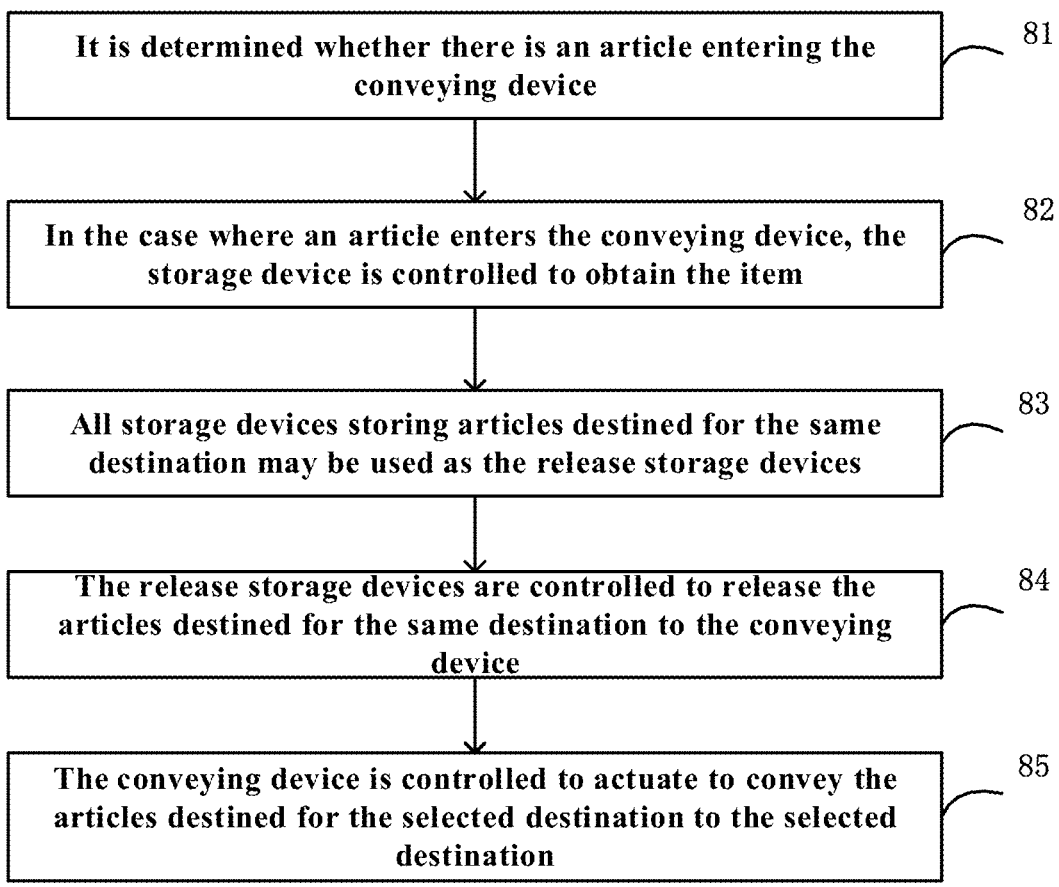
FIG. 8 is a schematic view of other embodiments of the storage and sorting method of the present disclosure.

FIG. 8 is a schematic view of other embodiments of the storage and sorting method of the present disclosure. In some embodiments, this embodiment may be performed by the storing and sorting apparatus of the present disclosure or the control device of the present disclosure. Step 81 to step 82 in the embodiment of FIG. 8 are the same as or similar to step 51 to step 52 of the embodiment in FIG. 5. The storage and sorting method may comprise step 81 to step 85.

In step 81, it is determined whether there is an article entering the conveying device, wherein the conveying device may be a conveying device in the storing and sorting apparatus according to any of the above embodiments (for example, any of the embodiments in FIGS. 1 to 4).

In step 82, in the case where an article enters the conveying device, the storage device is controlled to adsorb the article to the storage device, wherein the storage device may be a storage device in the storing and sorting apparatus according to any of the above embodiments (for example, any of the embodiments in FIGS. 1 to 4).

In step 83, during the sorting process, the release storage device is selected from the storage devices. In some embodiments, all storage devices storing articles destined for the same destination may be used as the release storage devices.

In step 84, the release storage devices are controlled to release the articles destined for the same destination to the conveying device.

In some embodiments, the step 84 may comprise step 841 and step 842 for the selected destination.

In step 841, according to the destination of the articles stored in the storage device, the storage units in each storage device storing the articles destined for the selected destination are determined, and the release storage devices are rotated so that these storage units rotate to be opposite to the conveying device.

In step 842, the magnetic adsorption force of the storage unit in the storage devices opposite to the conveying device is controlled to disappear, so that the article is released to the conveying device.

In step 85, the conveying device is controlled to actuate to convey out the articles so as to convey the articles to the selected destination.

Figure 9A:
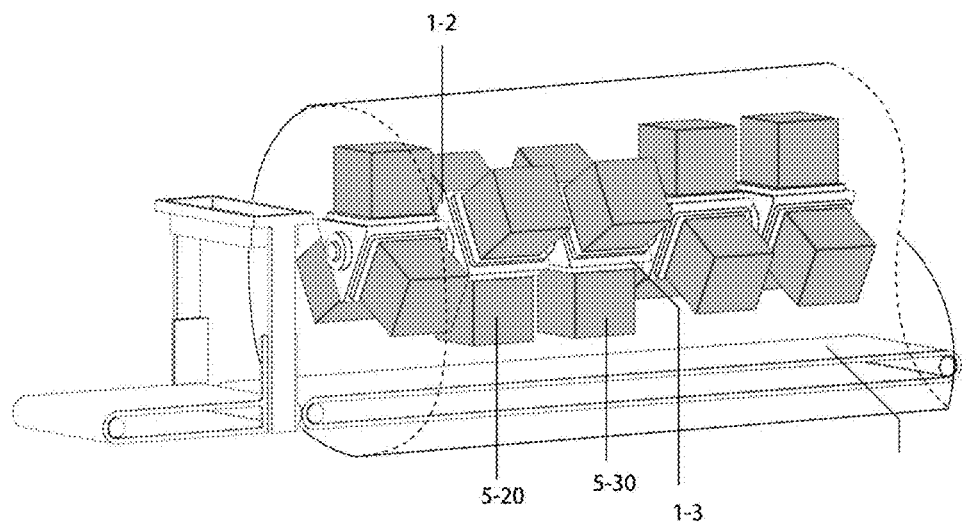
FIGS. 9A and 9B are schematic views of the sorting process of the storage and sorting method in some embodiments of the present disclosure.
Figure 9B:
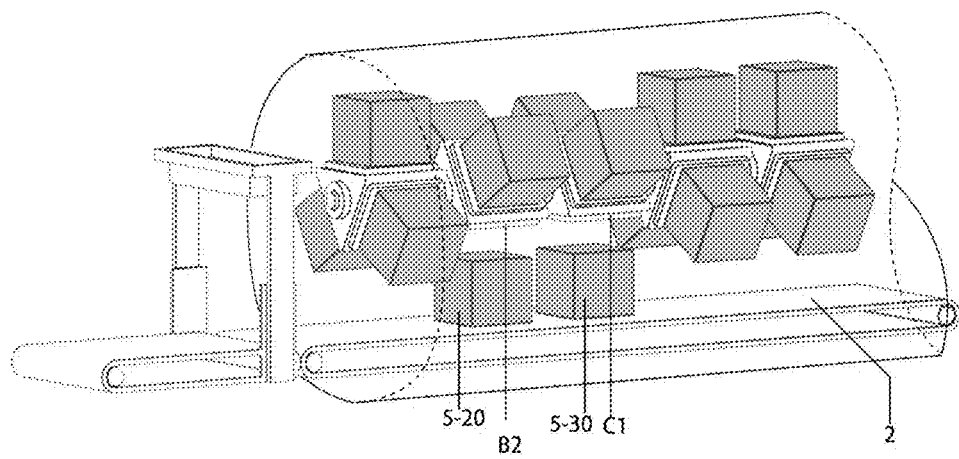

FIGS. 9A and 9B are schematic views of the sorting process of the storage and sorting method in some embodiments of the present disclosure. As shown in FIGS. 9A and 9B, the storage and sorting method may comprise step 91 to step 94.

In step 91, the control device outputs a signal to the rotatable storage devices, and as shown in FIG. 9A, all rotatable storage devices 1-2 and 1-3 in the device adsorbed with the articles 5-20 and 5-30 destined for the same destination rotate about the shaft 3 until the articles 5-20 and 5-30 are opposite to the conveying device 2.

In step 92, as shown in FIG. 9B, the control device outputs a signal to the rotatable storage devices, and the magnetic adsorption force of the magnetic storage units B2 and C1 with magnetism disappear, so that the articles 5-20 and 5-30 fall on the conveying device 2.

In step 93, the control device outputs a signal to the conveying device 2, and the conveying device 2 actuates to convey the articles 5-20 and 5-30 to the destination.

In step 94, the process of sorting other articles is the same as the above steps 91 to 93.

In the above-described embodiments of the present disclosure, the storage device and the sorting device are integrally designed, which may realize automatic storage and automatic sorting of articles, thereby simplifying the operation process of storage and sorting. Since a special sorting device is not required in the above-described embodiments of the present disclosure, the space occupied by the sorting device is saved. At the same time, operators are not required to complete the sorting operation in the above-described embodiments of the present disclosure, and compared with manual sorting, the efficiency is improved and the labor cost is reduced.

The integrated storing and sorting apparatus of the above-described embodiments of the present disclosure can support the disordered sorting and temporary storage of articles, thereby saving the time for the sorting operation of articles in a first-in and first-out manner, and the time for searching for articles during the process of warehouse entry→inventory→delivery. The above-described embodiments of the present disclosure are suitable for the temporary storage and sorting of fresh articles. After the temporary storage, sort-out is performed in time according to the temporal sequence of the shelf life within the shelf life of articles.

Figure 10:
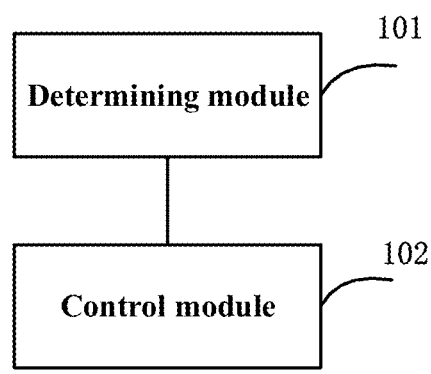
FIG. 10 is a schematic view of some embodiments of the control device of the present disclosure.

FIG. 10 is a schematic view of some embodiments of the control device of the present disclosure. As shown in FIG. 10, the control device of the present disclosure may comprise a determining module 101 and a control module 102.

The determining module 101 is configured to determine whether an article enters the conveying device. The conveying device may be a conveying device in the storing and sorting apparatus according to any of the above embodiments (for example, any of the embodiments in FIGS. 1 to 4).

In some embodiments, the determining module 101 may be configured to determine whether an article enters the conveying device according to the input signal of the information entry device. The information entry device may be an information entry device in the storing and sorting apparatus according to any of the above embodiments (for example, any of the embodiments in FIGS. 1 to 4).

The control module 102 is configured to control the storage device to adsorb the article to the storage device in the case where an article enters the conveying device. The storage device may be a storage device in the storing and sorting apparatus according to any of the above embodiments (for example, any of the embodiments in FIGS. 1 to 4).

In some embodiments, the control module 102 may be configured to determine whether the storing and sorting apparatus comprises a storage device that is not in full storage in the case where an article enters the conveying device; in the case where the storing and sorting apparatus comprises a storage device that is not in full storage, the target storage device is selected from the storage devices that are not in full storage according to a predetermined rule, and then the article is adsorbed to the target storage device.

In some embodiments, the control module 102 may be configured to control the target storage device to rotate by a predetermined number of degrees in the case where the article is adsorbed to the target storage device, so that the empty storage unit of the target storage device is opposite to the conveying device; control the conveying device to convey the articles under the target storage device, and stop the movement of the conveying device; and control the empty storage unit of the target storage device to obtain the article, and store the article in the target storage device.

In some embodiments, the target storage device may be one; in the case where the control module 102 conveys the articles under the target storage device, it may be configured to control the conveying device to convey the articles under the target storage device, wherein the number of articles is one.

In some embodiments, there may be a plurality of target storage devices; in the case where the articles are conveyed under the target storage device, the control module 102 may be configured to control the conveying device and the differential conveying device to convey a plurality of articles under the corresponding target storage device respectively, wherein the number of articles is not greater than the number of target storage devices.

In some embodiments, the control module 102 may also be configured to use all storage devices storing articles destined for the same destination as a release storage device; control the release storage device to release articles destined for the same destination to the conveying device; and control the conveying device to actuate so that the articles destined for the same destination are conveyed to the destination.

In some embodiments, in the case where the release storage device is controlled to release the articles destined for the same destination to the conveying device, the control module 102 may be configured to rotate the storage unit in the release storage device storing the articles destined for the same destination to be opposite to the conveying device; and control the storage unit storing the articles destined for the same destination to release the articles destined for the same destination to the conveying device.

In some embodiments, the control device is configured to perform operations to implement the storage and sorting method according to any of the above embodiments (for example, any of the embodiments in FIGS. 5 to 9).

The control device provided based on the above-described embodiments of the present disclosure may be applied to underground and ground multi-dimensional space scenarios so that there are many applicable environments; in the case of temporarily storing the same amount of articles, compared with the temporary storage warehouses in the related art, the space in a vertical direction may be used, thereby reducing the area required for temporary storage, raising the utilization of the temporary storage space, and improving the benefits that can be produced per unit area.

Figure 11:
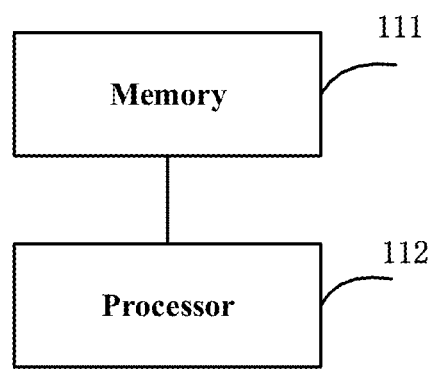
FIG. 11 is a schematic view of other embodiments of the control device of the present disclosure.

FIG. 11 is a schematic view of other embodiments of the control device of the present disclosure. As shown in FIG. 11, the control device of the present disclosure may comprise a memory 111 and a processor 112, wherein the memory 111 is configured to store instructions. The processor 112 is configured to execute the instructions, so that the device performs operations that implement the storage and sorting method described in any of the above-described embodiments (for example, any of the embodiments in FIG. 5 to FIG. 9).

In the above-described embodiments of the present disclosure, the storage device and the sorting device are integrally designed so that it is possible to realize automatic storage and automatic sorting of articles, thereby simplifying the operation process of storage and sorting; since a special sorting device is not required in the above-described embodiments, the space occupied by the sorting device is saved; at the same time, in the above-described embodiments of the present disclosure, operators are not required to complete the sorting operation, which improves the efficiency and reduces the labor cost compared with manual sorting.

The control device of the above-described embodiments of the present disclosure can support the disordered sorting and temporary storage of articles, thereby saving the time for the sorting operation of articles in a first-in and first-out manner, and the time for searching for articles during the process of warehouse entry→inventory→delivery. The above-described embodiments of the present disclosure are suitable for the temporary storage and sorting of fresh articles. After the temporary storage, sort-out is performed in time according to the temporal sequence of the shelf life within the shelf life of articles.

According to another aspect of the present disclosure, there is provided a computer-readable storage medium, wherein the computer-readable storage medium stores computer instructions which when executed by the processor implements the storage and sorting method according to any of the above-described embodiments (for example, any of the above-described embodiments in FIGS. 5 to 9).

The computer-readable storage medium provided based on the above-described embodiments of the present disclosure may be applied to underground and ground multi-dimensional space scenarios so that there are many applicable environments; in the case of temporarily storing the same amount of articles, compared with the temporary storage warehouses in the related art, the space in a vertical direction may be used, thereby reducing the area required for temporary storage, raising the utilization of the temporary storage space, improving the efficiency and reducing the labor cost.

In the above-described embodiments of the present disclosure, the storage device and the sorting device are integrally designed so that it is possible to realize automatic storage and automatic sorting of articles, thereby simplifying the operation process of storage and sorting; since a special sorting device is not required in the above-described embodiments, the space occupied by the sorting device is saved; at the same time, in the above-described embodiments of the present disclosure, operators are not required to complete the sorting operation, which improves the per capita efficiency compared with manual sorting.

The present disclosure can support the disordered sorting and temporary storage of articles, thereby saving the time for the sorting operation of articles in a first-in and first-out manner, and the time for searching for articles during the process of warehouse entry→inventory→delivery. The above-described embodiments of the present disclosure are suitable for the temporary storage and sorting of fresh articles. After the temporary storage, sort-out is performed in time according to the temporal sequence of the shelf life within the shelf life of articles.

What is claimed is:

1. A storing and sorting apparatus, comprising:
a conveying device configured to convey articles;
a shaft; and
at least one storage device, wherein the at least one storage device is located over the conveying device, is nested on the shaft and is configured to:
be driven to rotate about the shaft;
obtain and store the articles conveyed on the conveying device in a storage phase; and
release the stored articles to the conveying device in a sorting phase.

2. The storing and sorting apparatus according to claim 1, wherein an extending direction of the shaft is parallel to a conveying direction of the conveying device.

3. The storing and sorting apparatus according to claim 1, wherein:
the at least one storage device comprises a plurality of storage devices; and
the plurality of storage devices are distributed along an axial direction of the shaft, and the plurality of storage devices are configured to be driven to rotate about the shaft separately or simultaneously.

4. The storing and sorting apparatus according to claim 1, wherein the at least one storage device comprises a plurality of storage units configured to rotate about the shaft in the case where the at least one storage device rotates about the shaft.

5. The storing and sorting apparatus according to claim 4, wherein:
the at least one storage device is in the shape of a polygonal prism; each side of the polygonal prism is provided with a storage unit respectively, and each storage unit is configured to obtain and store one article.

6. The storing and sorting apparatus according to claim 4, wherein each of the plurality of storage units comprises a retractable gripping end.

7. The storing and sorting apparatus according to claim 6, wherein the gripping end comprises a chuck or a mechanical gripper.

8. The storing and sorting apparatus according to claim 1, further comprising:
an information entry device located on an opposite side of the conveying device along the conveying direction, and configured to obtain information of the articles to be entered into the conveying device.

9. The storing and sorting apparatus according to claim 1, further comprising:
a differential conveying device located on an opposite side of the conveying device along a conveying direction, and configured to convey the articles to the conveying device and adjust a movement speed so that the distance between every two adjacent articles is equal.

10. The storing and sorting apparatus according to claim 1, wherein:
the at least one storage device is configured to adsorb and store the articles conveyed on the conveying device by an adsorption force, or to grip and store the articles conveyed on the conveying device by a mechanical structure in the storage stage.

11. The storing and sorting apparatus according to claim 1, further comprising:
a control device connected to the conveying device and the at least one storage device and configured to:
control the conveying device to convey the articles under the storage device, and control the at least one storage device to obtain the articles in the storage phase; and
control the at least one storage device to release the stored articles to the conveying device in the sorting stage.

12. A storage and sorting method, comprising:
determining whether there is an article entering a conveying device of a storing and sorting apparatus, wherein the storing and sorting apparatus comprises the conveying device configured to convey articles, a shaft and at least one storage device, the at least one storage device is nested on the shaft and is configured to: be driven to rotate about the shaft; obtain and store the articles conveyed on the conveying device in a storage phase; and release the stored articles to the conveying device in a sorting phase; and
selecting a target storage device from the at least one storage device, and controlling the target storage device to obtain and store the article in the case where it is determined that an article enters the conveying device; wherein the at least one storage device is located over the conveying device.

13. The storage and sorting method according to claim 12, wherein the controlling the target storage device to obtain and store the article comprises:
   rotating the target storage device by a predetermined angle so that a position of an empty storage unit of the target storage device is opposite to the conveying device;
   conveying the article under the target storage device; and
   controlling the empty storage unit of the target storage device to obtain and store the article.

14. The storage and sorting method according to claim 13, wherein:
   when a number of target storage devices is one; the conveying the article under the target storage device comprises: controlling the conveying device to convey the article under the target storage device, wherein a number of articles is one; or
   when a number of target storage devices is plural; the conveying the articles under the target storage device comprises: controlling the conveying device and a differential conveying device to convey a plurality of articles under corresponding target storage devices respectively, wherein a number of articles is not greater than the number of target storage devices.

15. The storage and sorting method according to claim 12, further comprising:
   selecting a destination of currently sorted articles;
   determining all storage devices that store articles destined for the selected destination as release storage devices;
   controlling the release storage devices to release the articles destined for the selected destination to the conveying device; and
   controlling the conveying device to actuate to convey the articles to the destination.

16. A control device comprising:
   a memory configured to store instructions; and
   a processor configured to execute a method for performing instructions comprising:
      determining whether there is an article entering a conveying device of a storing and sorting apparatus, wherein the storing and sorting apparatus comprises the conveying device configured to convey articles, a shaft and at least one storage device, the at least one storage device is nested on the shaft and is configured to: be driven to rotate about the shaft; obtain and store the articles conveyed on the conveying device in a storage phase; and release the stored articles to the conveying device in a sorting phase; and
      selecting a target storage device from the at least one storage device, and controlling the target storage device to obtain and store the article in the case where it is determined that an article enters the conveying device; wherein the at least one storage device is located over the conveying device.

17. The control device according to claim 16, wherein the controlling the target storage device to obtain and store the article comprises:
   rotating the target storage device by a predetermined angle so that a position of an empty storage unit of the target storage device is opposite to the conveying device;
   conveying the article under the target storage device; and
   controlling the empty storage unit of the target storage device to obtain and store the article.

18. The control device according to claim 16, wherein the instructions further comprise:
   selecting a destination of currently sorted articles;
   determining all storage devices that store articles destined for the selected destination as release storage devices;
   controlling the release storage devices to release the articles destined for the selected destination to the conveying device; and
   controlling the conveying device to actuate to convey the articles to the destination.

19. A non-transitory computer-readable storage medium, wherein the computer-readable storage medium stores computer instructions which when executed by a processor implements the storage and sorting method according to claim 12.

* * * * *